Aug. 18, 1936.　　　E. BANDOLY　　　2,051,539
SPHYGMOMANOMETER
Filed Jan. 24, 1936　　　2 Sheets-Sheet 1
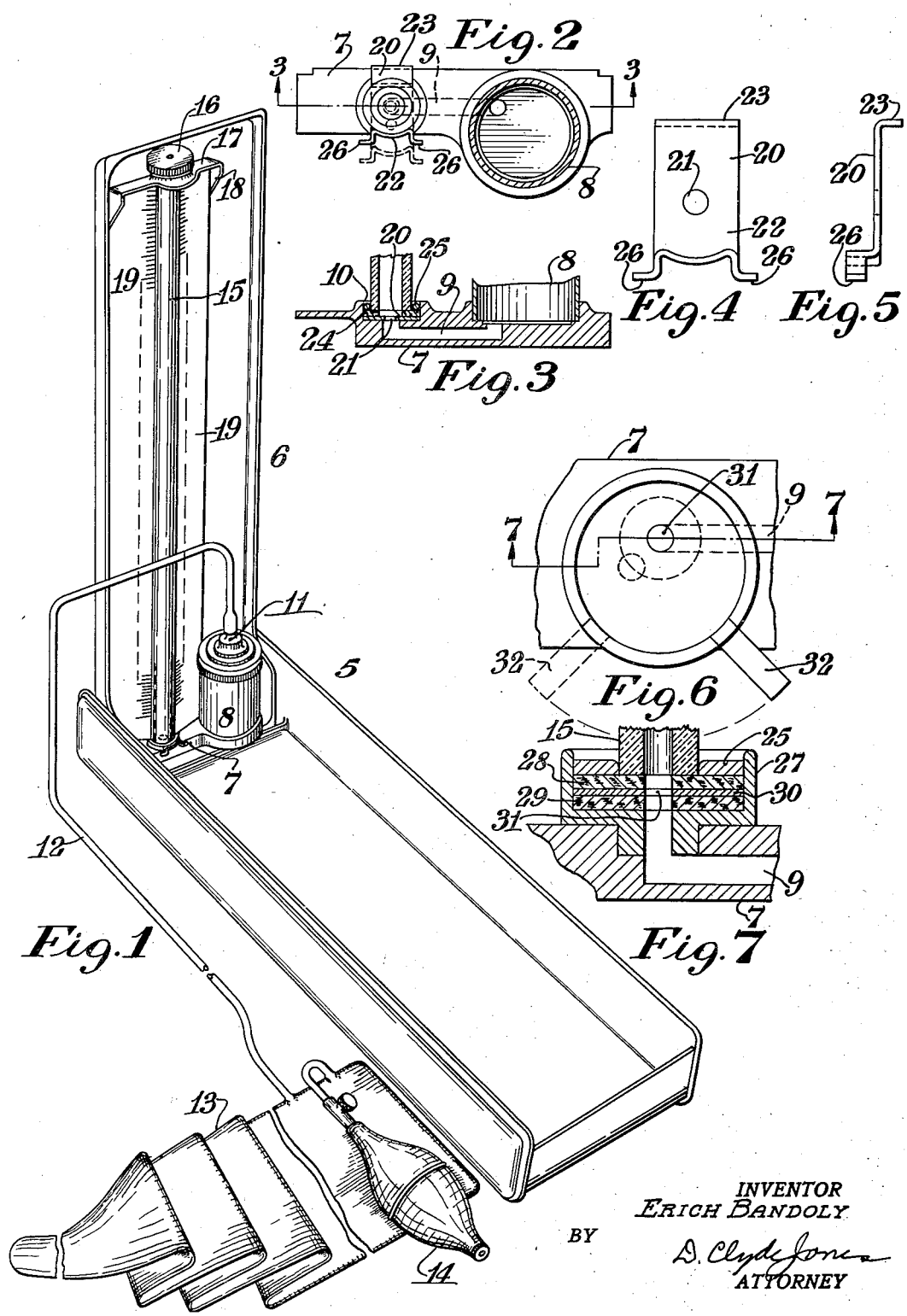

Aug. 18, 1936.    E. BANDOLY    2,051,539
SPHYGMOMANOMETER
Filed Jan. 24, 1936    2 Sheets—Sheet 2
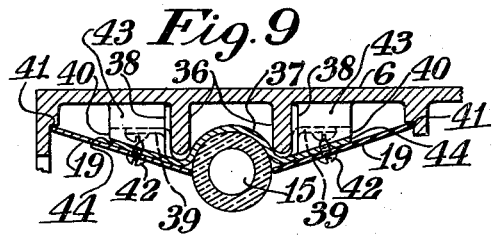
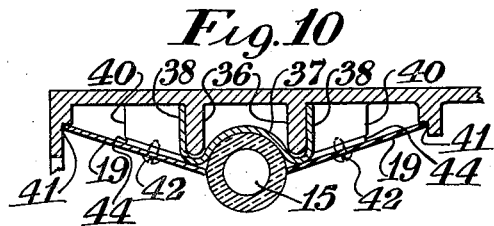
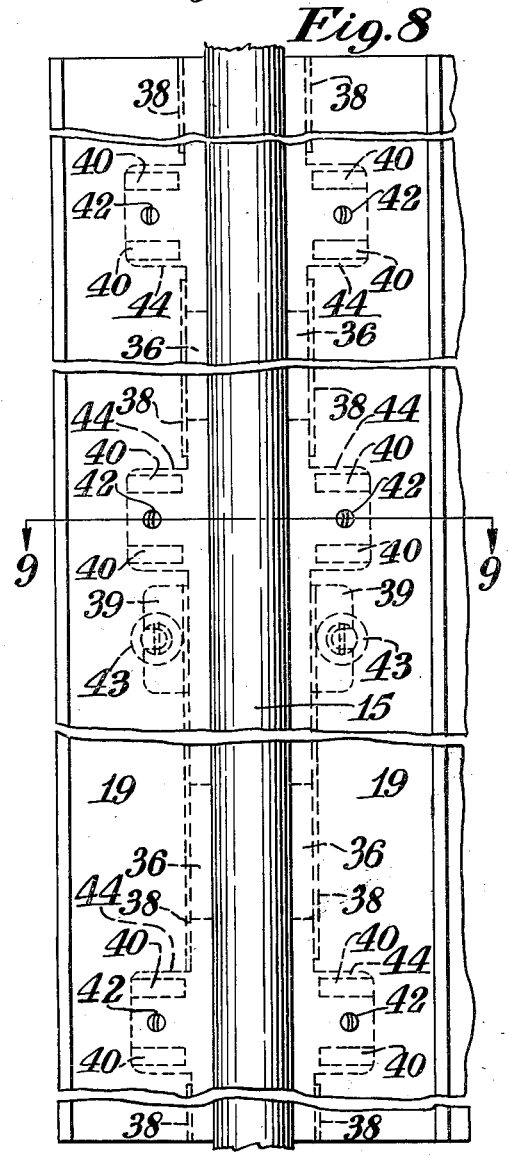
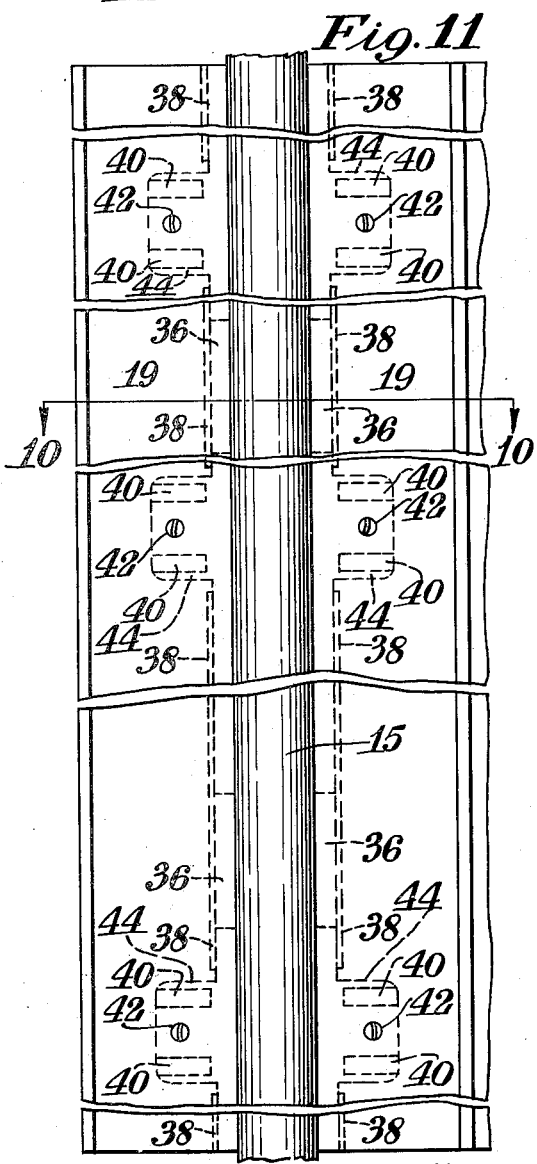
INVENTOR
ERICH BANDOLY
BY D. Clyde Jones
ATTORNEY Patented Aug. 18, 1936

2,051,539

UNITED STATES PATENT OFFICE 2,051,539

SPHYGMOMANOMETER

Erich Bandoly, Rochester, N. Y., assignor to Taylor Instrument Companies, Rochester, N. Y., a corporation of New York Application January 24, 1936, Serial No. 60,661

7 Claims. (Cl. 73—44)

This invention relates to manometers and more particularly to sphygmomanometers.

In sphygmomanometers employing mercury as the indicating liquid, much difficulty has been encountered in the past in preventing leakage of the mercury during transportation of the instruments. Various expedients have been resorted to, such as employing a stopper at the discharge opening in the fixture leading from the reservoir of the instrument, but such arrangements have been inconvenient to use.

In accordance with the present invention, it is proposed to provide a valve connection with the fixture associated with the reservoir whereby the mercury may be prevented at will from entering the glass indicating tube of the instrument without disturbing the tube or its mounting.

Another feature of the invention relates to a simple inexpensive arrangement for mounting the scale plates adjacent the indicating tube of the instrument.

Other features and advantages will appear from the detailed description and claims when taken with the drawings in which Fig. 1 is a perspective view of a sphygmomanometer of the present invention with the cover or instrument support thereof in its open position; Fig. 2 is a plan view, partially in section, of a reservoir and a reservoir fixture for the sphygmomanometer; Fig. 3 is a vertical section of the same taken substantially on the line 3—3 of Fig. 2; Figs. 4 and 5 are different views of the valve or cut-off plate interposed between the reservoir and the glass indicating tube; Fig. 6 is a fragmentary plan view of a modified fixture having mounted thereon a different type of cut-off valve; Fig. 7 is a vertical section of this construction taken on the line 7—7 of Fig. 6; Fig. 8 is an enlarged fragmentary front view of the scale plates of a modified type of scale plates and scale plate support; Fig. 9 is a cross section taken substantially on the line 9—9 of Fig. 8; Fig. 10 is a fragmentary front view; and Fig. 11 is a cross section of the same taken on the line 11—11 of Fig. 10.

Referring especially to Fig. 1, the numeral 5 generally designates a case having a cover or instrument support 6 hingedly connected to one end of the case proper, which cover is movable to the position shown in Fig. 1 when the instrument is in use and which can be folded down to close the case when the instrument is to be carried. This case and its cover may be made of any suitable material such as die-cast metal. The cover has mounted thereon, a fixture 7 carrying a steel reservoir 8 for mercury or the like, which fixture is provided with a passageway 9 leading from the reservoir to a recess 10 in the upper face of the fixture. The upper end of the reservoir 8 terminates in a nipple 11. This nipple has connected thereto, by a rubber tube 12, an inflatable cuff 13 which can be inflated by a well-known pump or hand bulb 14. A removable indicating tube 15 rests in the recess 10 and is in liquid-tight connection with the passageway 9. The upper end of this tube is retained in the position shown by an apertured cap 16 which is screw-threaded into a strip 17 having its down-turned ends 18 screwed to the cover in any suitable manner. The cap 16 includes a well-known barometer kid filter (not shown) of such texture that air will readily pass therethrough but the passage of mercury is prevented. At each side of the indicating tube 15, there is provided a graduated scale strip 19 which is mounted on the cover in a manner to be set forth.

It is the practice when shipping such an instrument to keep all of the mercury within the reservoir and the fixture thereof, to avoid the hammer action and leakage which would take place if the mercury were permitted to enter the indicating tube. In order to retain the mercury in the reservoir and the fixture during shipment, various expedients have been resorted to but it has been necessary to remove the indicating tube 15, or to disturb the relation of the cap 16 with the end of the tube in order to introduce a cork or to actuate a plug at the discharge opening of the fixture. In accordance with the present invention, a novel arrangement is provided whereby the flow of mercury from the fixture to the indicating tube is cut-off at will without disturbing the tube or cap. In this arrangement a valve plate 20, provided with an opening 21 therein slides on the bottom of the recess 10, or a washer (not shown) resting thereon, and has its front end portion 22 projecting through a slot in the front of the fixture. The rear end of this slide is provided with a stop 23 which limits the outward movement of the slide, thereby preventing its withdrawal completely from the fixture. On the top of the plate 20 there is provided a washer of cork 24, or other suitable material having an opening therein which registers with the bore in the indicating tube 15 and with the discharge opening of the passageway 9. A suitable ring 25 serves to center the indicating tube 15 with its bore in registry with the opening in the washer.

When the instrument is in use, the valve plate 20 is pushed inwardly as far as it can go, as indicated by the full line position in Fig. 2 so that the opening 21 in the plate will register with the opening in the washer and with the bore of the tube 15. When it is desired to cut off the flow of mercury or other indicating medium from the passageway 9 in the fixture into the bore of the indicating tube 15, the plate is pulled to its outermost position as determined by the stop 23, the projecting hooks or handles 26 facilitating this movement of the plate.

In the modified form of the invention shown in Figs. 6 and 7, a cup 27 having an aperture therein, is mounted on the fixture 7 so that the aperture in the cup communicates with the passageway 9 in the fixture. This cup is provided with washers 28 and 29 of a somewhat resilient material such as cork. These washers have apertures therein communicating with the aperture in the cup. There is interposed between these washers a valve disc 30 having an opening 31 therein. This opening is positioned eccentrically in the disc so that when the disc is in the position shown in full lines, its opening registers with the openings in the washers. However, when the disc is rotated to its dotted line position as illustrated in Fig. 6, this opening is out of registry with the openings in the washers. This disc is provided with a handle 32 projecting through the rim of the cup so that the disc can be rotated between the two extreme positions as indicated.

The scale plates 19 are preferably mounted on the cover 6 of the instrument, as will best be understood from the disclosure in Figs. 8 and 9. There are provided on the cover, two forwardly projecting ribs 36 spaced apart a distance approximately equal to the diameter of the indicating tube 15. An arcuate backing piece 37 generally conforming to the curvature of the indicating tube is provided with resilient lugs 38 which grip the outer sides of the ribs 36. The backing strip is also provided with a pair of apertured arms 39 which are adapted to receive screws by which the arms are attached to internally threaded lugs 43 on the front of the instrument cover. The backing strip is also provided with several pairs of ears 44, herein illustrated as three pairs, on which the scale plates 19 are mounted. Each of the ears 44 rests on the front end of a boss 40 carried by the cover. These scale plates, which are suitably graduated in units of measure, such as millimeters of mercury, have their inner vertical edges positioned closely adjacent the indicating tube 15, while their outer edges respectively engage notches 41 in raised portions of the instrument cover. It should be noted that these scale plates 19 are secured by screws or other suitable fastening means to the arms 44 provided on the backing of the strip.

In the modified form of the invention shown in Fig. 10 the backing strip 37 is held on the instrument cover merely by the frictional engagement of the lugs 38 with the outside surfaces of the ribs 36, due to the natural resilience of these lugs. The scale plates 19 are mounted on the arms 40 as previously indicated and the remaining construction is similar to that shown in Figs. 8 and 9. In this arrangement it is merely necessary to remove the indicating glass 15 when it is desired to remove the scale plates from the instrument cover, the removal thereof being effected merely by pulling the backing strip and the scale plate attached thereto forward to disengage the resilient lugs 38 from the ribs 36.

I claim:

1. In a device of the class described, a reservoir containing mercury or like indicating liquid, a fixture having a discharge opening therein and a passageway leading from said discharge opening to the interior of said reservoir, a transparent indicating tube in substantially liquid-tight engagement with said fixture and with the bore of said tube in communication with said passageway, and a sliding valve associated with said fixture and movable at right angles to the discharge portion of said passageway whereby the flow of mercury from said passageway is permitted or stopped as desired.

2. In a device of the class described, a reservoir containing mercury or like indicating liquid, a fixture having a discharge opening therein and a passageway leading from said discharge opening to the interior of said reservoir, a transparent indicating tube in substantially liquid-tight engagement with said fixture and with the bore of said tube in communication with said passageway, and a valve plate movable in its principal plane across said passageway to open and close the same at will whereby the flow of mercury from said passageway is permitted or stopped as desired.

3. In a device of the class described, a reservoir containing mercury or the like indicating liquid, a fixture having a discharge opening therein and a passageway leading from said discharge opening to the interior of said reservoir, a transparent indicating tube in substantially liquid-tight engagement with said fixture and with the bore of said tube in communication with said passageway, and a valve plate movable rectilinearly in its principal plane across said passageway to open and close the same at will whereby the flow of mercury from said passageway is permitted or stopped as desired.

4. In a device of the class described, a reservoir containing mercury or the like indicating liquid, a fixture having a discharge opening therein and a passageway leading from said discharge opening to the interior of said reservoir, a transparent indicating tube in substantially liquid-tight engagement with said fixture and with the bore of said tube in communication with said passageway, and a valve plate associated with said fixture and rotatable in its principal plane to open and close said passageway at will whereby the flow of mercury from said passageway is permitted or stopped as desired.

5. In a device of the class described, a reservoir containing mercury or the like, a fixture joined to said reservoir, said fixture having a recess therein and a passageway therethrough extending from said recess to the interior of said reservoir, a resilient washer having an aperture therein and positioned in said recess with its aperture in registry with the discharge opening in said passageway, an indicating tube in substantially liquid-tight engagement with said washer, the bore of said tube communicating with the opening in the washer, and an apertured valve plate in engagement with said washer and being adjustable across said passageway to move its aperture into and out of registry with the opening in said washer.

6. In a device of the class described having a transparent indicating tube therein, a support having two widely spaced projecting portions and having two projecting ribs thereon between said portions, said ribs being spaced apart a distance approximately equal to the diameter of said indicating tube, and a scale plate unit comprising a graduated portion and an arcuate backing portion adapted to receive said tube, the side edges of said scale plate unit engaging said projecting portion, the principal part of said backing portion being mounted between said ribs, and resilient lugs on said unit gripping the surfaces of said ribs.

7. In a device of the class described having a transparent indicating tube therein, a support having two projecting ribs spaced apart a distance approximately equal to the diameter of said indicating tube, a projecting part at one side of said ribs, an arcuate backing portion to be received between said ribs and adapted to receive said tube, resilient lugs on said portion gripping the outside surfaces of said ribs, and a graduated strip extending adjacent said tube and attached to said backing portion, said strip resting on said part.

ERICH BANDOLY.